United States Patent [19]  [11] 3,887,621
Polss  [45] June 3, 1975

[54] MODIFIED POLYMERS AS PETROLEUM ADDITIVES

[75] Inventor: Perry Polss, Wilmington, Del.

[73] Assignee: E. I. du Pont de Nemours & Co., Wilmington, Del.

[22] Filed: Apr. 9, 1973

[21] Appl. No.: 349,304

[52] U.S. Cl.... 260/583 R; 260/583 P; 260/583 CC; 260/583 F; 44/72
[51] Int. Cl............................................ C07c 87/04
[58] Field of Search ........ 260/583 R, 583 H, 583 P, 260/583 CC, 583 F

[56] References Cited
UNITED STATES PATENTS
3,576,742  4/1971  Honnen et al............... 260/583 CC Primary Examiner—Lewis Gotts
Assistant Examiner—D. R. Phillips
Attorney, Agent, or Firm—James A. Costello

[57] ABSTRACT

Disclosed herein is the reaction product made by reacting a $C_3$ or $C_4$ olefin hydrocarbon polymer with nitrosyl chloride, followed by heating, and then followed by reaction with an amine. Also disclosed are petroleum fuels containing the modified polymer reaction products as useful additives therein.

10 Claims, No Drawings

MODIFIED POLYMERS AS PETROLEUM ADDITIVES

BACKGROUND OF THE INVENTION

1. Field of the Invention

This invention concerns nitrogen-containing hydrocarbon fuel additives.

2. Description of the Prior Art

Numerous suggestions have been made in the art for overcoming difficulties in the operation of internal combustion engines. Various suggestions have been aimed at achieving one or more of the following goals: intake valve cleanliness; carburetor detergency and anti-icing; hydrocarbon and carbon monoxide emissions control; and carbonization residue reduction.

Many of the suggestions for achieving one or more of the goals set out above involve utilization of, say, phosphorus-containing gasoline additives. Other references teach nitrogen-containing gasoline additives. One such reference is U.S. Pat. No. 3,438,757 which teaches the alkylation of certain amines with high molecular weight halogenated polyolefins.

SUMMARY OF THE INVENTION

This invention concerns the hydrocarbon fuel-soluble reaction product prepared by the process of i. reacting an olefin polymer, selected from $C_3$, $C_4$ and $C_3/C_4$ olefin polymers having a molecular weight in the range of about 500 to 2,500, and containing at least one ethylenic unsaturation, with at least one mole of nitrosyl chloride per mole of the ethylenic unsaturation, at a temperature of from about −25°C. to 50°C., and introducing into the polymer from 75% to 100% of the theoretical amount of one chemically bound nitrogen per ethylenic unsaturation;

ii. heating the product of (i) at about 60°C. to 100°C. until it is free of substantially all unreacted nitrosyl chloride; and iii. reacting the product of (ii) with an aliphatic hydrocarbon primary or secondary amine having about 4 to 20 carbon atoms, at a temperature of about 60°C. to 100°C., the amine being used at about the molar equivalent of ethylenic unsaturation in the olefin polymer reactant of (i), until cessation of water evolution.

Preferred olefin polymers are polypropylene and polyisobutylene having molecular weights between about 800 to 1,500. The preferred amines are aliphatic hydrocarbon monamines of about 6 to 12 carbon atoms, with 2-ethylhexylamine being most preferred.

By "hydrocarbon fuel-soluble" is meant that the product is soluble in hydrocarbon fuel to the extent of at least 0.0004 percent by weight. Hydrocarbon fuels include gasoline, diesel fuel, jet fuels, kerosene, distillate and residual fuel oils. The preferred hydrocarbon fuel is gasoline which can consist of straight chain or branched chain paraffins, cycloparaffins, olefins and aromatic compounds or any mixture of these. Such hydrocarbons are obtainable from straight run naphtha, polymer gasoline, natural gasoline, thermally or catalytically cracked hydrocarbons and catalytically reformed stocks.

The hydrocarbon fuel can also contain any of the conventional additives normally added thereto. Thus, gasoline may contain anti-knock compounds such as tetraethyllead, tetramethyllead, mixed methyl-ethyl lead tetraalkyl, halogen-containing scavenging compounds such as ethylene chloride, ethylene bromide or a mixture thereof; and other conventional additives such as corrosion inhibitors, dyes, anti-oxidants, anti-rust agents, antiicing agents, gum formation inhibitors, anti-preignition agents and the like. Diesel fuels, jet fuels, kerosene, distillate and residual fuel oils may contain antioxidants, anti-rust agents, pour improvers, lubricity agents, anti-icing agents, dispersants, detergents, antistatic agents, anti-corrosion agents and the like.

The product of the invention is incorporated into the hydrocarbon fuels by any conventional means. The addition to hydrocarbon fuels is facilitated when the product is added thereto as a concentrate. Hydrocarbon fuel compositions will contain from about 0.004 to 0.2 percent by weight of the reaction product of the invention. The preferred range is from about 0.03 to 0.06 percent by weight.

By a mole of "ethylenic unsaturation" is meant a mole of structural unit represented by

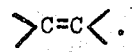

Thus, if a given polymer contains one ethylenic unsaturation, then one mole of the polymer will contain one mole of ethylenic unsaturation; if the polymer contains two ethylenic unsaturations, then one mole of the polymer will contain two moles of ethylenic unsaturation.

DETAILS OF THE INVENTION

The olefin polymers useful in the invention include poly(propylene), poly(1-butylene), poly(2-butylene), poly-(isobutylene) as well as propylene-butylene copolymers. Normally, the olefin polymers will have one mole of ethylenic unsaturation per mole of polymer but the polymers may contain more than one ethylenic unsaturation per molecule. It is also contemplated that a mixture of $C_3$ and $C_4$ olefin polymers is used.

The reaction of nitrosyl chloride with the olefin polymer is usually carried out by adding one mole of nitrosyl chloride for each mole of ethylenic unsaturation in the polymer. The reaction can be carried out by mixing the two reactants at the described temperature range. However, the reaction is more easily carried out in the presence of an inert solvent such as benzene, toluene, xylene, hexane, cyclohexane, chloroform and carbon tetrachloride. By inert solvent is meant a solvent which is unreactive toward nitrosyl chloride. When a solvent is used, from 10 to 500 parts, preferably from 25 to 35 parts per 100 parts of the olefin polymer is used. If desired, the solvent can be carried through the several steps of the reaction so that the reaction product is provided as a concentrate in such solvents. The solvent in such concentrate can comprise from 10 to 90 percent, preferably 30 to 80 percent by weight of the concentrate. The preferred solvents are commercially available mixed xylenes.

Nitrosyl chloride is usually added to the olefin polymer(s) over a period of from about 10 minutes to 150 minutes, during which addition slight exothermicity may be observed. The reaction is considered to be complete when at least 75 percent of the theoretical nitrogen has been introduced into the olefin polymer. Since the reaction of nitrosyl chloride with olefin polymer in this step of the reaction is considered to be that of addition of nitrosyl chloride to ethylenic unsaturation to form nitrosochloride as indicated by

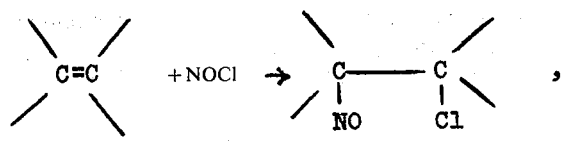

it is clear that theoretically one nitrogen atom per ethylenic unsaturation can be introduced. The completion of this step of the reaction is indicated by cessation of absorption of nitrosyl chloride or may be determined by taking a portion of the reaction mixture and analyzing for the nitrogen in the polymer in any conveient manner. The reaction between nitrosyl chloride and olefin polymer is usually carried out under atmospheric pressure but reaction may also be carried out under higher pressures.

In the second step of the process, the reaction product from the first step is heated at 60° to 100°C. The heating is normally carried out at around 100°C. under atmospheric pressure. During the heating step any unreacted nitrosyl chloride present from the first step is evolved. Some (about 20 mol %) water is also evolved. The heating is continued until evolution of water ceases. Normally, the heating process will require from about 1 to 10 hours and may be carried out under atmospheric, subatmospheric or superatmospheric pressures. This step of the reaction is conveniently carried out in the presence of a solvent which may be the same solvent used in step 1. A solvent which will distill azeotropically with water is particularly preferred, such solvent being benzene, toluene and xylene, particularly xylene. When water is azeotropically removed, the solvent after separation from eater may be returned to the reaction mixture.

In the third step of the reaction, an aliphatic hydrocarbon amine containing 4 to 20 carbon atoms having at least one primary or secondary amino group is added to the reaction product of the second step and the heating at 60° to 100°C. is continued. Heating is continued until evolution of water ceases (about 20 mol %) which process normally requires from 1 to 5 hours. The aliphatic hydrocarbon amine has at least one primary or secondary amino group, normally not more than two primary amino groups or more than about nine secondary amino groups and includes primary monamines, secondary monoamines as well as polyamines.

The primary monamines are of the formula, $RNH_2$, wherein R represents an aliphatic hydrocarbyl group of 4 to 20 carbon atoms, said hydrocarbyl group being straight-chain and branched-chain, saturated and unsaturated group; preferably the R group is saturated aliphatic hydrocarbyl group of about 6 to 12 carbon atoms.

The secondary monoamines are of the formula $R^1R^2NH$ wherein $R^1$ and $R^2$ represent aliphatic straight-chain and branched-chain, saturated and unsaturated hydrocarbyl group and wherein the total number of carbon atoms in $R^1$ and $R^2$ is from about 4 to 20.

The polyamines contain at least one primary or secondary amino group and the preferred polyamines are of the formula $R^3R^4N(R^5NH)_nH$ wherein $R^3$ and $R^4$ are independently hydrogen or a lower alkyl, $R^5$ is an alkylene group of 2 or 3 carbon atoms, n is 1 to 10, $R^3$, $R^4$, $R^5$ and n being so chosen that the total number of carbon atoms in the polyamine is between 4 and 20.

Representative amines are n-butylamine, n-hexylamine, N-octylamine, n-decylamine, n-dodecylamine, 2-ethylhexylamine, 2,2,4,4-tetramethylpentylamine, 1,1-dimethyl-n-octylamine, n-octadecylamine, n-octadecenylamine, N-methyl-n-butylamine, N-methyl-n-hexylamine, N-ethyl-2-ethylhexylamine, N-methyloctadecylamine, N-methyloctadecenylamine, diethylenetriamine, tetraethylenepentamine, pentaethylenehexamine, decaethyleneundecamine, dipropylenetriamine, tripropylenetetraamine, dimethylaminopropylamine, N-dodecylpropylenediamine and the like. The most preferred amine is 2-ethylhexylamine.

The amount of the amine added is normally one mole of the amine compound per mole of the ethylenic unsaturation in the olefin polymer used in the first step. An excess of amine, say, two molar proportions, can be used but no additional benefit is gained thereby.

When a solvent is employed it is preferably one which distills azeotropically with water. The solvent may be returned to the reaction mixture after separation of water. The product after cooling and filtration, if desired, is ready for use. The reaction product is preferably obtained as a concentrate in the solvent, the amount of solvent in the concentrate being readily controlled by either partial removal in step 2 or 3 (or both) of the reaction or by addition after the completion of the reaction.

The exact structure of the product produced by the process as described is not known but the product is believed to be a complex mixture of compounds. In the first step of the reaction, particularly when conducted at the lower temperatures, the initial product formed is believed to be chloronitrosopolymer formed by the addition of nitrosyl chloride to ethylenic unsaturation in the polymer. The chloronitrosopolymer is believed to be present as a mixture of monomer and dimer, as evidenced by the characteristic blue-green color of the monomeric nitroso compound, which color is dependent upon temperature, being more intense at higher temperature. However, upon standing and particularly upon heating, various changes involving isomerization, disproportionation, elimination and the like take place. Evolution of water, hydrogen chloride and ammonia (as ammonium chloride) indicate some of these changes.

Upon addition of an amine to the reaction products of step 2 and heating, additional reactions take place as evidenced by the evolution of water. Analyses of the reaction products of the invention indicate that the reaction products of the invention are complex mixtures of compounds. Among the types of compounds present in the complex mixtures are saturated and unsaturated polymers with chloro, nitro, amino and/or oximino groups in diverse combinations, unsaturated polymers, as well as some unreacted amine and amine hydrochloride.

The degree of incorporation of nitrogen and chlorine in the final product is dependent upon the particular olefin polymer and amine used and upon the reaction conditions such as the temperature at which nitrosyl chloride is added to the olefin polymer in step 1 and the temperature and the time of heating in step 2. The theoretical amount of nitrogen and chlorine introducible into the product is the total amount of nitrogen and chlorine introduced via nitrosyl chloride and the amine, assuming all of the chlorine of the nitrosyl chloride and all of the nitrogen of the nitrosyl chloride and of the amine becomes chemically bound to the polymers. The products of the invention, prepared as described, normally contain from about 20 to about 95 percent of the theoretical nitrogen and from about 35 to 90 percent of the theoretical chlorine.

DESCRIPTION OF THE PREFERRED EMBODIMENTS

The following Examples are meant to illustrate but not to limit the scope of this invention. Percentages are by weight unless indicated to the contrary. Molecular weights were determined by vapor pressure osmometry as described in ASTM D-2503. In the contemplated molecular weight range the olefin polymer will have from about 36 to 180 carbon atoms.

EXAMPLE 1

In a laboratory reaction vessel equipped with a thermometer, a gas inlet tube and a reflux condenser, is placed a solution of 560 g. (0.4 mole) of polyisobutylene of 1400 molecular weight in 300 ml. of benzene. To the stirred polymer solution at room temperature (~25°C.), nitrosyl chloride gas (26.2 g; 0.4 mole) is introduced. A slight exotherm is observed and the solution changes in color from pale yellow to deep green. Upon heating at benzene reflux temperature (~80°C.), some water and hydrogen chloride are evolved and the color turns to clear amber. Elemental analysis of a portion of the product after removal of benzene shows % C, 83.3; % H, 12.8; % N, 1.0 and % Cl, 2.0. To the refluxing solution of the product, 2-ethylhexylamine (51.6 g.; 0.4 mole) is added. Considerable fuming occurs upon initial addition of the amine but after a small amount of the amine is added, fuming ceases. After the completion of amine addition the clear solution is heated at the reflux temperature for several hours during which time additional water was evolved. Elemental analysis of the product after removal of the benzene solvent shows % C, 82.5; % H, 13.5; % N, 1.6 and Cl, 2.0.

The product of this Example was tested and gave a Federal Water Interaction Test value [Method 3251.7 Federal Test Method Standard No. 791 B] of 1b at 0.04 wt. % in isooctane and of 3 at 0.06 wt. % in isooctane. An intake valve deposit test at 0.029 wt. % gave a CRC rating of 8.8 and a deposit weight of 0.16 g. which is only 16 percent of the weight of the deposit obtained upon burning isooctane without the presence of the novel product of this Example.

EXAMPLE 2

This example illustrates a preparation of a product of the invention prepared from poly(isobutylene) of 1400 molecular weight, nitrosyl chloride and 2-ethylhexylamine.

In a reaction vessel equipped with a thermometer, an agitator, a gas inlet tube and a reflux condenser, 72.4 parts of poly(isobutylene) of 1400 molecular weight is dissolved in 21.3 parts of xylene. Solution temperature is about 25°C. Nitrosyl chloride, 3,4 parts, is introduced via gas inlet tube over a period of about 90 minutes. Completion of NOCl addition to ethylenic unsaturation is indicated by cessation of absorption of NOCl gas. A temperature rise to about 31°C. is observed. A small amount of hydrogen chloride is evolved. The reaction mixture is stirred for 2–3 hours and then heated at 100°C. for about 5 hours during which period about 1.4 parts of water is evolved. To the reaction mixture, 6.7 parts of 2-ethylhexylamine is added over a period of about 15 minutes. The heating at 100°C. is continued for about 5 hours during which time additional 1.4 parts of water is evolved. The contents of the reaction vessel is cooled to provide 100 parts, 200 pounds, of the reaction product dissolved in xylene (an 80 percent solution).

Analyses of the product after removal of xylene show 1.2% nitrogen and 1.6% chlorine. Thus, about 68% of the nitrogen and 71% of the chlorine are retained in the final product.

EXAMPLES 3–11

Using the general procedure of Example 2, the products of Table 1 were prepared and are designated therein in terms of Polymer (M.W.)/NOCl/Amine. The reactants are used in equimolar proportions, unless indicated otherwise, i.e. a mole of nitrosyl chloride and a mole of an amine per mole of ethylenic unsaturation in the olefin polymer used. Theoretical nitrogen and chlorine values are based on the total amount of nitrogen and chlorine introduced via nitrosyl chloride and amine in equimolar amounts to ethylenic unsaturation in the olefin polymer. The abbreviations PIB and PP are for poly(isobutylene) and polypropylene, respectively.

TABLE 1

| Example | Novel Reaction Products | % Nitrogen | | % Chlorine | |
|---|---|---|---|---|---|
| | | Theo. | Fd. | Theo. | Fd. |
| 3 | PIB (1400)/NOCl/(CH$_3$)$_2$NCH$_2$CH$_2$CH$_2$NH$_2$ | 2.68 | 0.8 | 2.26 | 0.5 |
| 4 | PIB (1400)/NOCl/nC$_9$H$_{19}$C(CH$_3$)$_2$NH(CH$_2$CH$_2$—OH) | 1.64 | 1.0 | 2.08 | 1.2 |
| 5 | PIB (800)/NOCl/2-ethylhexylamine | 2.92 | 1.5 | 3.70 | 2.2 |
| 6 | PIB (2500)/NOCl/2-ethylhexylamine | 1.04 | 0.5 | 1.32 | 1.0 |
| 7 | PIB (2500)/NOCl(CH$_3$)$_2$CH$_2$CH$_2$CH$_2$NH$_2$ | 1.58 | 0.5 | 1.33 | 0.8 |
| 8 | PP (850)/NOCl/2-ethylhexylamine | 2.78 | 1.4 | 3.52 | 1.9 |
| 9 | PP (850)/NOCl/(CH$_3$)$_2$NCH$_2$CH$_2$CH$_2$NH$_2$ | 4.28 | 0.8 | 3.62 | 1.3 |
| 10 | PP (850)/NOCl/tetraethylenepentamine | 7.73 | 3.9 | 3.27 | 0.9 |
| 11 | PP (850)/NOCl/2-ethylhexylamine (2 moles) | 2.78 | 1.6 | 3.52 | 2.0 |

EXAMPLE 12 (Utility)

Intake Valve Deposit (IVD) TEST

Buick Electras (1971) with 455 CID, low compression engines (8.5:1) equipped with 4-barrel carburetors and automatic transmissions were used. Air conditioning, standard equipment in these automobiles, was used. Completely reconditioned heads with weighed intake valves were installed before tests. Deposits from piston heads were removed and the intake manifolds were solvent-cleaned. New spark plugs, points, PCV valves, air filters and oil filters were installed. Carburetor adjustments and timing were carried out according to the manufacture's specifications.

Mileage accumulation was carried out on a Programmed Chassis Dynamometer (PCD) according to the folowing schedule.

| Mode | Time in Mode (sec.) | Conditions, mph |
|---|---|---|
| 1 | 60 | Idle |
| 2 | 20 | Accelerate to 70 |
| 3 | 30 | Alternate acceleration/ deceleration between 60 and 70 at 5 sec. intervals |
| 4 | 25 | Decelerate to 40 |
| 5 | 15 | Accelerate to 70 |
| 6 | 100 | Repeat Modes 3, 4, 5 and 3 |
| 7 | 25 | Decelerate to idle |
| 8 | — | Repeat above for 110 hours |

At the conclusion of the test, deposits on the intake valves were weighed and expressed as g./valve. The intake valve tulip deposites were also rated using the standard Coordinating Research Council (CRC) merit rating scale wherein a clean valve has a rating of 10. Deposits on the valve stem were also rated with a clean stem having a rating of 10. Stem rating is carried out by comparison with a standard photographic scale.

The results are summarized in the following Table 2. Additionally, for comparative purposes, the results obtained with polyisobutenyl oxime and a physical mixture of poly(isobutylene), 2-ethylhexylamine and 2-ethylhexylammonium chloride are included. The polyisobutenyl oxime is prepared by reacting nitrosyl chloride with poly(isobutylene) at about 0°C. and then treating the chloronitrosopoly(isobutylene) with a base such as triethylamine or aqueous sodium hydroxide. The gasoline used is MS-08, an industry standard fuel used for Sequence MS oil testing.

in Run 6 containing poly(isobutylene) 87.5 lb., 2-ethylhexylamine 5.4 lb., and 2-ethylhexylamine hydrochloride, 3.1 lb. is based on a typical product of the invention found by analysis to contain typically about the indicated amounts of the amine and the amine hydrochloride. Run 6 demonstrates that the addition of the amine and the amine hydrochloride to poly(isobutylene) do not provide a composition which is as effective as the novel products in controlling intake valve deposit or keeping the valve stems clean.

EXAMPLE 13 (Utility)

Carburetor Detergency

The usefulness of the products of the present invention as carburetor detergents was demonstrated by two series of tests. The first test measured the effectiveness of the products in removing deposits already present in the carburetor. The second test measured their effectiveness in keeping the carburetor clean.

In the first test, deposits were initially accumulated in the carburetor under specified conditions. The effectiveness of an additive as carburetor detergent was then determined by operating the engine with fuel containing the additive and by measuring the amount of accumulated deposit removed.

Chevrolet engines, 6 cylinder, 230 cu. in., having Carter No. 3511-S carburetors and ice towers with heaters were used. One engine was used to produce, in the shortest time, sufficient throttle body deposit for the clean-up phase of the test. Since the deposit accumulation phase of the test was carried out over a period of about 10 hours and the clean-up phase of the test required about 50 hours, by utilizing one engine for deposit accumulation and several engines for the clean-up portion of the test, the testing was accomplished in the shortest time. In the deposit accumulation engine the ring gap of the top piston ring was increased by ⅛ to 0.138 inch and the ring was installed in place of the second compression ring, leaving the top ring groove empty thus increasing the blowby. The total blowby was directed to the carburetor air cleaner from the dome cover. The air cleaner element was eliminated. The exhaust line was modified to supply engine exhaust to the carburetor air cleaner.

TABLE 2

Intake Valve Deposit Control

| Run No. | Additive | (Wt. %) | IVD g. | Tulip Rating | Rating |
|---|---|---|---|---|---|
| 1 | Example 2 | (0.038) | 0.82 | 7.1 | 9.6 |
| 2 | Example 8 | (0.038) | 0.83 | 7.1 | 9.4 |
| 3 | Example 5 | (0.038) | 1.21 | 6.7 | 8.7 |
| 4 | Example 6 | (0.038) | 0.79 | 7.3 | — |
| 5 | Polyisobutenyl oxime | (0.038) | 1.28 | 6.4 | 8.9 |
| 6 | Physical mixture PIB (1400) 87.5 lb. 2-ethylhexylamine 5.4 lb. 2-ethylhexylamine hydrochloride 3.1 lb. | (0.038) | 1.74 | 6.0 | 8.0 |
| 7 | None (Control) | — | 2.32 | 7.1 | 5.1 |

The above results show that the products of the invention are highly effective in controlling deposit accumulation on the intake valves and are particularly effective in keeping the valve stems clean. The results also show that the products of the invention are superior in controlling deposits on the intake valves to polyisobutenyl oxime alone. The physical mixture used The engine was operated under the following conditions: the distributor vacuum advance was eliminated to maintain spark advance of 4° before top center; engine speed at 700 ± 10 rpm; water outlet temperature 175°± 2.5°F.; air/fuel mixture at maximum vacuum; carburetor air cooled by passage through an ice tower and then reheated to 90°–95°F.; and engine exhaust supplied to carburetor air inlet as described below.

The fuel used as MS-08, an industry standard fuel used for Sequence MS oil testing. The engine was started with the exhaust feed valve to engine inlet air closed. The speed was adjusted to 700 rpm at maximum vacuum. The exahust feed valve was opened and the engine speed maintained at 700 rpm. The exhaust feed valve setting is critical. The setting was such as to feed the maximum amount of exhaust that the engine would accept and still operate smoothly without stalling. The engine was operated for about 10 hours or until it could no longer be kept running under these conditions. The carburetor was removed and rated using a visual rating chart. A rating of 100 is clean. If a rating cleaner than 30 is obtained, additional deposit accumulation was required.

For the clean-up phase of the test, the "dirty" carburetor was installed in another engine and the operating conditions described above were used except that normal piston rings were used and the blowby and exhaust were not fed into the air inlet. Before the test new spark plugs were installed, SAE 30 low detergent oil placed in the crankcase and the air cleaner housing and exhaust system were cleaned.

The clean-up procedure was followed for 50 hours in five 10-hr. segments, the ratings being made at appropriate intervals to determine the amount and the speed of clean-up. The percent clean-up was determined according to the following formula % Clean-up $= [(R_O - R_D)/(100 - R_D)] \times 100$ wherein $R_D$ is the carburetor rating after deposit accumulation and $R_O$ is the carburetor rating after clean-up.

In the second test, the carburetor keep-clean test (Onan) was carried out in a single cylinder engine in which a controlled amount of exahust gas from another engine was mixed with air supplied to the test carburetor. The test carburetor throat consisted of a two-piece stainless steel liner fitted around the throttle plate shaft. The liner was easily removed for inspection and rating. The engine was operated under cycling conditions of one minute idling and three minutes of part throttle for an overall test period of two hours. A visual rating scale of 10 for a clean carburetor and ) 0 a very dirty carburetor was used. Generally, a rating of about 7 or greater is considered satisfactory carburetor keep-clean.

The results of carburetor detergency tests are summarized in Table 3. In run no. 1, no additive was used in the MS-08 control fuel. The results show that the novel additives clean carburetors and keep them clean.

TABLE 3

Carburetor Detergency

| Run No. | Additive | (Wt.%) | Cleanup Test % Cleanup | Keep Clean Test Onan-Rating |
|---|---|---|---|---|
| 1 | None | — | 16 | 4.5 |
| 2 | Example 2 | (0.032) | — | 6.9 |
| 3 | Example 2 | (0.038) | 25 | 7.5 |
| 4 | Example 2 | (0.06) | 23 | 7.4 |
| 5 | Example 8 | (0.038) | 23 | 7.6 |
| 6 | Example 5 | (0.038) | 24 | 7.9 |
| 7 | Example 6 | (0.038) | 20 | 7.5 |
| 8 | Example 3 | (0.038) | 27 | 7.7 |
| 9 | Example 7 | (0.038) | 31 | 7.4 |

EXAMPLE 14 (Utility)

Carburetor Anti-icing

The anti-icing properties of the novel products were determined by using a gasoline containing the additive and measuring the number of cycles before stalling. The test was carried out with a Chevrolet 230 cubic inch, 6 cylinder engine. The environment of the carburetor was maintained at 40°F. and 95% relative humidity. Thus, water-saturated cool air was drawn through the carburetor. The test consisted of running the engine on a two part cycle, namely 21 seconds with open throttle at an engine speed to 1,600 rpm and 9 seconds with the throttle almost closed at 400 rpm (idling speed). During the test, ice formed on the throttle plate and on the surrounding carburetor walls and caused the engine to stall by blocking the flow of air when the throttle plate was almost closed during the idling portion of the cycle.

The base gasoline was so chosen that, normally, in the absence of an effective anti-icing additive, engine stalling occurred in about 3–5 cycles. Generally, an additive is considered effective if it prevents stalling to about 10 cycles; an excellent anti-icing agent prevents stalling to at least about 25 cycles. The base gasoline used had a 50 percent distillation point of 197°F. according to ASTM D-86 Method. The anti-icing test results are summarized in Table 4.

TABLE 4

Carburetor Anti-Icing

| Run No. | Additive | (Wt. %) | Average No. of Cycles to Stall |
|---|---|---|---|
| 1 | None | | 4.5 |
| 2 | Example 2 | (0.032) | 5.0 |
| 3 | Example 2 | (0.038) | 25+ |
| 4 | Example 2 | (0.060) | 25+ |
| 5 | Example 8 | (0.032) | 14.7 |
| 6 | Example 8 | (0.036) | 25+ |
| 7 | Example 8 | (0.038) | 25+ |
| 8 | Example 5 | (0.038) | 25+ |
| 9 | Example 6 | (0.038) | 10.5 |
| 10 | Example 3 | (0.038) | 6.7 |
| 11 | Example 7 | (0.038) | 4.5 |
| 12 | polyisobutenyl oxime | (0.038) | 5.0 |

The above results show that the products of the invention prepared by using monoamines are excellent carburetor anti-icing agents. The products prepared from a diamine containing a primary amino group and a tertiary amino group while demonstrated to be effective carburetor detergents in Example 13 are not as effective as anti-icing agents. Polyisobutenyl oxime is shown to be a very poor anti-icing agent.

EXAMPLE 15 (Utility)

Exhaust Emission Control

The effectiveness of the products of the present invention in reducing the emission of hydrocarbons and carbon monoxide in exhaust gases of internal combustion engines was determined in two tests.

In the first test, a Cooperative Lubricant Research test (CLR), a LABECO single cylinder CLR oil test engine described in Federal Test Method 348T-568 was used. The test was carried out over 96 hours comprising 24 cycles of 4 hours each under the following conditions for each 4-hour cycle:

|  | I | II |
|---|---|---|
| Time (hr.) | 3 | 1 |
| Speed, rpm | 1800 | 1800 |
| Load, bhp | 7-8 | 7-8 |
| Air/fuel ratio | 15.25:1 | 15.25:1 |
| Coolant out, F° | 120 | 200 |
| Oil Gallery, F° | 150 | 180 |
| Blowby, cfh | 20 | 20 |
| Spark advance °btc | 10 | 10 |
| Oil pressure, psig | 40 | 40 |
| Carburetor air temperature F° | 190 | 190. |

The fuel used was standard leaded reference fuel. The exhaust gas samples were taken once during each 8-hour work shift, the samples for hydrocarbon determinations being taken when the engine was operating during a low temperature cycle immediately following air/fuel ratio determination. The hydrocarbons were analyzed by nondispersive infrared spectrometry using a Liston Becker Model 21 instrument.

In the second test, a Cooperative Fuel Research test (CFR), a single cylinder, variable compression ratio Waukesha CFR F-4 type engine was used under the following engine operating conditions:

| Compression ratio | 6.38 |
|---|---|
| Air/fuel ratio | 16:1 |
| Speed, rpm | 1200 |
| Spark °btc | 15 |
| Inlet air temperature,°F. | 200 |
| Oil temperature, °F. | 145 |
| Coolant temperature, °F. | 212 |
| Fuel delivery | cylinder injection, 50° ATDC |
| Trace knock monitoring | dp/dt pick-up. |

The engine was operated with lead-free gasoline for 50 hours, a time interval sufficient to establish deposit equilibrium. The engine compression ratio of 6.38 is 0.5 compression ratio unit lower than the deposit-free, clean engine trace-knock limited compression ratio of 6.88 for the base fuel under the above-listed operating conditions in order to permit deposit accumulation to reach equilibrium without encountering knocking combustion. The exhaust gases were sampled at preselected intervals during the deposit accumulation period by means of a ¼ inch o.d. stainless steel probe located approximately 2 inches downstream from the exhaust port and positioned in the center and in the direction of exhaust flow.

The sample was drawn through the probe by means of a small diaphragm pump, led through dual coils and trap cooled by ice water to condense moisture, passed through a doubly-backed glass fiber filter to remove particulates and finally collected in an evacuated container of approximately 7 liters capacity specially constructed with adapters and fittings to facilitate analysis. The time required to fill the container was approximately 1¼ minutes. The exhaust gas samples were analyzed for hydrocarbons and carbon monoxide by nondispersive infrared spectrometry using a Liston Becker Model 21 instrument. Carbon monoxide analysis was also done by gas chromatography as an independent check.

Using the CFR engine and the operating conditions mentioned above, the effectiveness of the novel products in reducing hydrocarbon emissions from the engine already having equilibrium deposit accumulation was also determined. The results are summarized below in Table 5. The comparisons are made with hydrocarbon and carbon monoxide emissions obtained with base gasoline alone.

TABLE 5

Reduction of Hydrocarbon and Carbon Monoxide Emissions

| Run No. | Additive | (Wt. %) | CLR Keep-Clean % Reduction Hydrocarbon | CFR Keep-Clear % Reduction Hydrocarbon | CO | CFR Clean-up % Reduction Hydrocarbon |
|---|---|---|---|---|---|---|
| 1 | Example 2 | (0.029) | 41 | — | — | — |
| 2 | Example 6 | (0.038) | 33 | — | — | — |
| 3 | Example 2 | (0.038) | — | 27 | 50 | — |
| 4 | Example 6 | (0.16) | — | 27 | 50 | — |
| 5 | Example 2 | (0.04) | — | — | — | 14 |

The results clearly show that the novel products are effective in reducing exhaust gas emissions of hydrocarbons and carbon monoxide. While the mechanism whereby the emission of hydrocarbons is reduced is not exactly known, it is believed that the products of the invention modify or decrease the amount of the combustion chamber deposits. Additionally, in the CFR engine tests wherein a filter is placed in the sampling line to remove particulates, it is found that with base gasoline alone heavy black particulates are collected, whereas when the engine is operated on the same base fuel containing a product of the invention, the filter contains considerably smaller quantities of particulates (light in color).

EXAMPLES 16 (Utility)

The effectiveness of a product of the present invention to reduce the amount of carbonization residue upon heating hydrocarbon fuels is demonstrated using ASTM D524 "Ramsbottom Carbon Residue of Petroleum Products" Method. The base fuel was Sun light cycle gas oil. The test indicates coke-forming or deposit-forming propensities of hydrocarbon fuels upon pyrolysis. The results are summarized below in Table 6. The value for Run No. 1-8, wt. % Carbon, represents the average of 8 control valves.

TABLE 6

Ramsbottom Carbon Residue

| Run No. | Additive | (Wt. %) | Wt., % Carbon (10% Bottom) | % Reduction |
|---|---|---|---|---|
| 1-8 | None | — | 0.55 | — |

TABLE 6-Continued

Ramsbottom Carbon Residue

| Run No. | Additive | (Wt. %) | Wt., % Carbon (10% Bottom) | % Reduction |
|---|---|---|---|---|
| 9 | Example 2 | (0.004) | 0.47 | 13 |
| 10 | Example 2 | (0.02) | 0.50 | 7 |
| 11 | Example 2 | (0.04) | 0.46 | 15 |
| 12 | Example 2 | (0.20) | 0.34 | 37 |

The embodiments of the invention in whicn an exclusive property or privilege is claimed are defined as follows:

1. A hydrocarbon fuel-soluble reaction product prepared by the process of
   i. reacting an olefin polymer, selected from $C_3$, $C_4$ and $C_3/C_4$ olefin polymers having a molecular weight in the range of about 500 to 2,500, and containing at least one ethylenic unsaturation, with at least one mole of nitrosyl chloride per mole of the ethylenic unsaturation, at a temperature of from about $-25°C$. to $50°C$., and introducing into the polymer from 75 to 100 percent of the theoretical amount of one chemically bound nitrogen per ethylenic unsaturation;
   ii. heating the product of (i) at about $60°C$. to $100°C$. until it is free of substantially all unreacted nitrosyl chloride; and
   iii. reacting the product of (ii) with an aliphatic hydrocarbon primary or secondary amine having about 4 to 20 carbon atoms, at a temperature of about $60°C$. to $100°C$., the amine being used at about the molar equivalent of ethylenic unsaturation in the olefin polymer reactant of (i), until cessation of water evolution.

2. A reaction product according to claim 1 wherein the olefin is selected from polypropylene and polyisobutylene.

3. A reaction product according to claim 2 wherein the olefin is polypropylene having a molecular weight between about 800 to 1,500.

4. A reaction product according to claim 2 wherein the olefin is polyisobutylene having a molecular weight between about 800 to 1,500.

5. A reaction product acccording to claim 1 wherein the amine is an aliphatic hydrocarbon monoamine of 6 to 12 carbon atoms.

6. A reaction product according to claim 5 wherein the amine is 2-ethylhexylamine.

7. A reaction product according to claim 2 wherein the amine is an aliphatic hydrocarbon monoamine of 6 to 12 carbon atoms.

8. A reaction product according to claim 7 wherein the amine is 2-ethylhexylamine.

9. A process for preparing a hydrocarbon fuel-soluble reaction product according to claim 1 comprising
   i. reacting an olefin polymer, selected from $C_3$, $C_4$, and $C_3/C_4$ olefine polymers having a molecular weight in the range of about 500 to 2,500, and containing at least one ethylenic unsaturation, with at least one mole of nitrosyl chloride per mole of the ethylenic unsaturation, at a temperature of from about $-25°C$. to $50°C$., and introducing into the polymer from 75 to 100 percent of the theoretical amount of one chemically bound nitrogen per ethylenic unsaturation;
   ii. heating the product of (i) at about $60°C$. to $100°C$. until it is free of substantially all unreacted nitrosyl chloride; and
   iii. reacting the product of (ii) with an aliphatic hydrocarbon primary or secondary amine having about 4 to 20 carbon atoms, at a temperature of about $60°$ to $100°C$., the amine being used at about the molar equivalent of ethylenic unsaturation in the olefin polymer reactant of (i), until cessation of water evolution.

10. A concentrate comprising the reaction product according to claim 1 in an inert solvent therefor which is unreactive toward nitrosyl chloride.

* * * * *